(No Model.) 2 Sheets—Sheet 1.

W. C. DENNIS.
FRICTION CLUTCH.

No. 531,624. Patented Jan. 1, 1895.

Witnesses
Allie C. Whiting.
Emma K. Kester.

Inventor
Willie C. Dennis
By his Attorney
Rufus B. Fowler

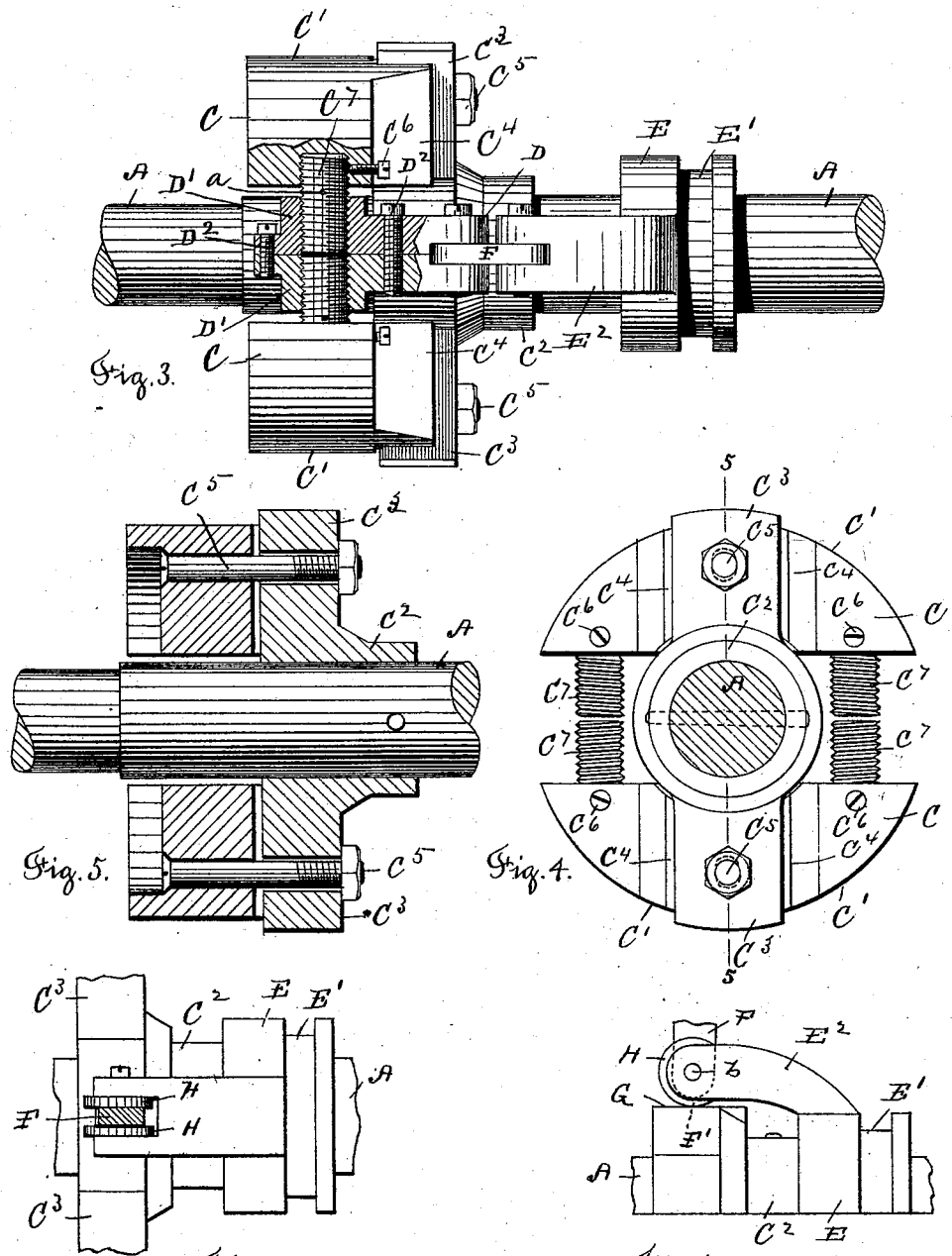

UNITED STATES PATENT OFFICE.

WILLIE C. DENNIS, OF BELLOWS FALLS, VERMONT.

FRICTION-CLUTCH.

SPECIFICATION forming part of Letters Patent No. 531,624, dated January 1, 1895.

Application filed August 4, 1892. Serial No. 442,192. (No model.)

*To all whom it may concern:*

Be it known that I, WILLIE C. DENNIS, a citizen of the United States, residing at Bellows Falls, in the county of Windham and State of Vermont, have invented a new and useful Improvement in Friction-Clutches, of which the following is a specification, accompanied by drawings, forming a part of the same, and in which—

Figure 1:
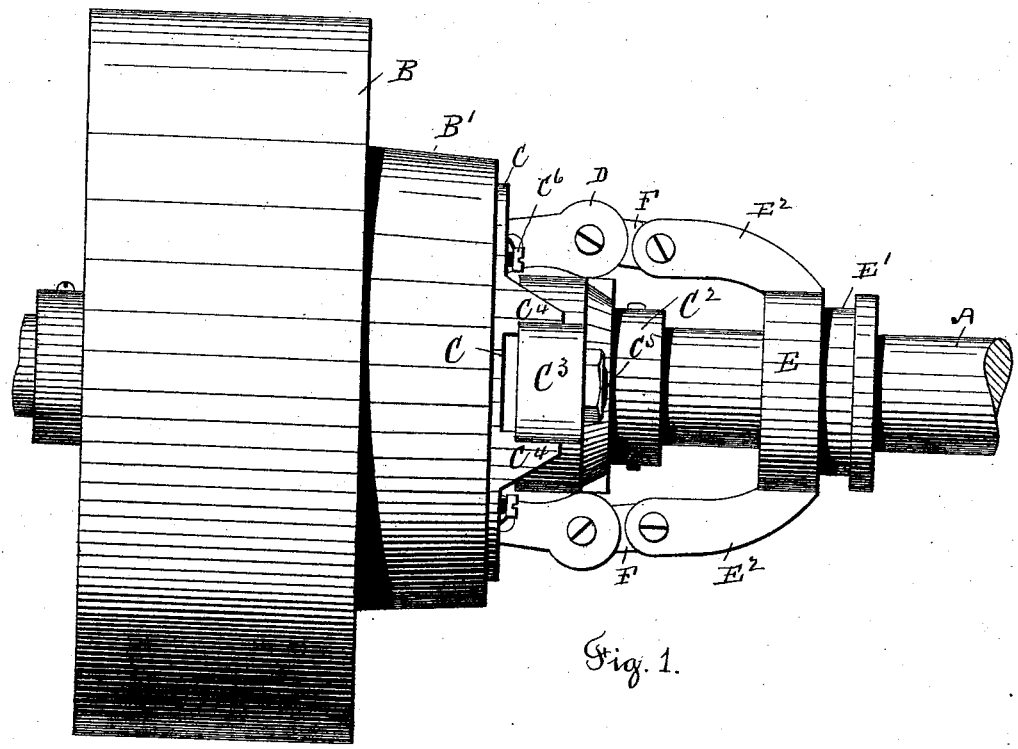
Figure 2:
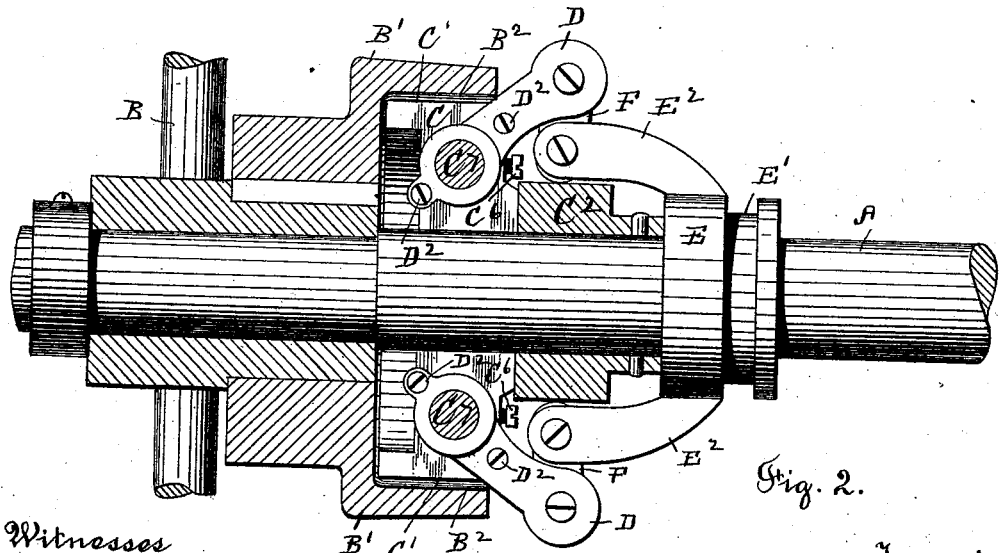

Figure 1 represents a side view of a friction clutch embodying my invention. Fig. 2 is a vertical, central, sectional view of the clutching mechanism; the rim of the pulley having been removed and the operating parts of the mechanism shown in their position when the frictional surfaces of the clutch are brought into contact. Fig. 3 represents, in detached view, the operative parts of the clutch, a portion having been removed in order to show the right and left hand screw threaded bolts by which the friction blocks are actuated. Fig. 4 represents a detached view of the friction blocks and the two armed collar attached to the shaft and forming the "driver." Fig. 5 is a sectional view of the friction blocks and driver shown on line 5, 5, Fig. 4. Fig. 6 represents one-half of the sliding collar E, with one of its projecting arms $E^2$ showing the application of the friction rolls H, H, and Fig. 7 represents another view of the same parts shown in Fig. 6.

Similar letters refer to similar parts in the different figures.

Referring to the drawings, A denotes a shaft; B, a belt pulley running loosely upon the shaft and having attached to its hub a flange B' with its inner surface $B^2$ turned smooth and concentric with the shaft A and forming a friction surface to be engaged by the concentric frictional surfaces C' of the segmental blocks C.

Attached to the shaft A is a collar $C^2$, provided upon opposite sides with the radial arms $C^3$, which are inclosed between the lips $C^4$ projecting from the sides of the blocks C, by which the rotation of the blocks, when they are engaged and driven by the flange B' are communicated through the arms $C^3$ and collar $C^2$ to the shaft A.

The segmental friction blocks C are held in contact with the arms $C^3$ by the bolts $C^5$, which pass through holes slightly elongated, or larger than the diameter of the bolts, so as to allow the radially sliding motion of the friction blocks C along the arms $C^3$.

Inserted in the ends of the blocks C and held from turning by the set screws $C^6$ are the right and left handed screw threaded studs $C^7$, which carry the levers D. The levers D are each made in halves D', D', united by the screws $D^2$, $D^2$, one-half being provided with a right hand screw thread engaging the right hand screw threaded stud and the other half having a left hand screw thread and engaging the left hand screw threaded stud. Sliding upon the shaft A is a collar E, provided with an annular groove E' to receive the fork of a shipping lever in the usual and well known manner by which the collar can be moved along the shaft A.

Projecting from the collar E are the arms $E^2$, having their ends connected with the ends of the levers D by the links F, so the sliding motion of the collar E along the shaft A and toward the pulley B, or from the position shown in Fig. 1 to that shown in Fig. 2, will cause an angular motion to be imparted to the levers D, D, rocking them upon the screw threaded studs $C^7$. As the studs $C^7$, carried by one of the friction blocks C, are provided with right hand screw threads and the studs $C^7$ carried by the opposite friction block are provided with left hand screw threads and as each pair of oppositely threaded studs are in alignment and are engaged by the right and left hand screw threads in the levers D, the angular movement of the levers D from the position shown in Fig. 1 to that shown in Fig. 2 will cause the friction blocks C, C to be separated and forced against the inner or friction surface $B^2$ of the flange B', causing the rotary motion of the pulley B to be communicated to the shaft, or vice versa.

The friction blocks C, C are forced apart equally at opposite ends and the pressure applied to the blocks C, C is received by the screw threads in the levers D, the pressure exerted in one direction upon one of the blocks C, being balanced by the pressure exerted in the opposite direction upon the opposite block, the two oppositely directed pressures equalizing each other and both being received by the levers D.

The right and left hand screw threaded studs $C^7$ are provided with holes $a$, to receive a pin or spanner, by which, by loosening the set screws $C^6$, the studs $C^7$ can be rotated within the levers D, in order to adjust the relative position of the blocks C to the levers, and thereby compensate for wear upon the friction surfaces. The collar $C^2$ is provided with the surfaces G, G, upon opposite sides and immediately beneath the arms $E^2$ when they are moved into the position shown in Fig. 2, the surfaces G being arranged to receive the contact of the ends F' of the links F, so that the strain exerted by the links upon the ends of the levers D, at the time of contact of the frictional surfaces $B^2$ and C' will be received upon the surfaces G, G, thereby relieving the pins $b$.

The friction produced by the sliding contact of the ends F', of the links F upon the surfaces G, G, is obviated, in clutches of the larger sizes, by means of the friction rolls H, H, shown in Figs. 6 and 7 which are placed upon the pins $b$ and are of such diameter as to be brought in contact with and made to roll over the surfaces G, G, while the ends F' of the links F are carried out of contact with the collars $C^2$.

What I claim as my invention, and desire to secure by Letters Patent, is—

1. The combination of a revolving shaft, a pulley carried on said shaft and provided with an internal friction surface, a collar attached to said shaft and having radial arms projecting from said collar, a pair of segmental friction blocks carried by said arms and capable of a sliding motion thereon, said friction blocks being placed diametrically opposite each other, studs projecting from the opposite ends of one of said friction blocks and having right hand screw threads, studs projecting from the opposite ends of the opposite friction block and having left hand screw threads, each pair of right and left hand screw threaded studs having their axes in alignment, rocking levers having right and left hand screw threads engaging said studs and connected means for rocking said levers, whereby said friction blocks are radially moved.

2. The combination of shaft A, pulley B having an internal friction surface $B^2$, collar $C^2$ having radial arms $C^3$, segmental friction blocks C carried by said arms, studs $C^7$ held in the opposite ends of said friction blocks and having right and left hand screw threads, the studs in one block having their axes in alignment with the studs in the opposite block, levers D, D provided with right and left hand screw threads engaging said studs, sliding collar E having arms $E^2$ and links F connecting said arms with said levers D, whereby said levers are rocked by the sliding movement of said collar, substantially as described.

3. In a friction clutch, the combination with a pulley having an internal friction surface, as at $B^2$, of a pair of friction blocks C, C placed diametrically opposite each other, screw threaded studs $C^7$ adjustably held in said blocks and at opposite ends of said blocks, and screw threaded rocking levers engaging said studs, substantially as described.

4. The combination of a shaft A, pulley B concentric with said shaft and having an internal friction surface $B^2$, friction blocks arranged to bear against said internal friction surface, actuating mechanism for separating said block comprising rocking levers D, sliding collar E having arms $E^2$, links F connecting said arms with said rocking levers, a fixed collar $C^2$ held in said shaft provided with surfaces G, G parallel with the axis of said shaft adapted to support the ends of said links F in their sliding movement over said surfaces, substantially as described.

Dated this 26th day of July, 1892.

WILLIE C. DENNIS.

Witnesses:
HERBERT D. RYDER,
GEORGE URQUHART.